United States Patent
Tudor et al.

(10) Patent No.: US 7,460,639 B2
(45) Date of Patent: Dec. 2, 2008

(54) NONINTRUSIVE INSPECTION METHOD AND SYSTEM

(75) Inventors: Mircea Tudor, R-Bucharest (RO); Constantin Sima, R-Bucharest (RO); Gheorghe Tudor, R-Ganeasa Village (RO); Rasvan Ionescu, R-Bucharest (RO); Cristian Grechi, R-Târgu Neamt (RO); Emilian Mieilica, R-Pucioasa (RO); Eduard Serban, R-Pucioasa (RO); Adrian Bîzgan, R-Bucharest (RO); Adrian Duralia, R-Craiova (RO); Florin Oancea, R-Pucioasa (RO); Petre Ghita, R-Slatina (RO); Sergiu Semenescu, R-Bucharest (RO)

(73) Assignee: S.C. MB Telecom Ltd.-S.R.L., R-Otopeni (RO)

( * ) Notice: Subject to any disclaimer, the term of this patent is extended or adjusted under 35 U.S.C. 154(b) by 110 days.

(21) Appl. No.: 11/664,385

(22) PCT Filed: Dec. 20, 2004

(86) PCT No.: PCT/RO2004/000018

§ 371 (c)(1),
(2), (4) Date: Mar. 30, 2007

(87) PCT Pub. No.: WO2006/036076

PCT Pub. Date: Apr. 6, 2006

(65) Prior Publication Data

US 2008/0123809 A1    May 29, 2008

(30) Foreign Application Priority Data

Sep. 30, 2004   (RO) .......................... A 2004-00830

(51) Int. Cl.
*G01N 23/04* (2006.01)
*G01N 23/05* (2006.01)

(52) U.S. Cl. ................. 378/57; 250/359.1; 250/390.02
(58) Field of Classification Search ............... 378/57; 250/359.1, 390.01, 390.02, 390.04
See application file for complete search history.

(56) References Cited

U.S. PATENT DOCUMENTS 3,844,018 A    10/1974   Calhoun (Continued)

FOREIGN PATENT DOCUMENTS

CN    1142609 A    2/1997

(Continued)

OTHER PUBLICATIONS

International Search Report dated Jun. 3, 2005.

(Continued)

*Primary Examiner*—Chih-Cheng G Kao
(74) *Attorney, Agent, or Firm*—Buchanan Ingersoll & Rooney PC

(57) ABSTRACT

This invention relates to an inspection method and system that radiographs containers, vehicles and train carriages without having to break seals, open containers or physical control. The inspection method consists of an autonomous mobile scanning unit, installed on a chassis that has a remote controlled drive, steering and brakes and another autonomous mobile unit referred as "source robot", that moves synchronized with the scanning unit and whose drive, steering and braking are also remotely controlled. The two units are moving synchronized with low, constant speed, electronically controlled, framing the object that is to be inspected, in a protected perimeter where the access is managed by an automated traffic management subsystem. The system is made out of autonomous mobile scanning units, managed by a third mobile unit which is towable, that is a remote control centre. The system also includes an automated traffic management subsystem and an exclusion area protection subsystem.

12 Claims, 13 Drawing Sheets

U.S. PATENT DOCUMENTS

Figure 1:
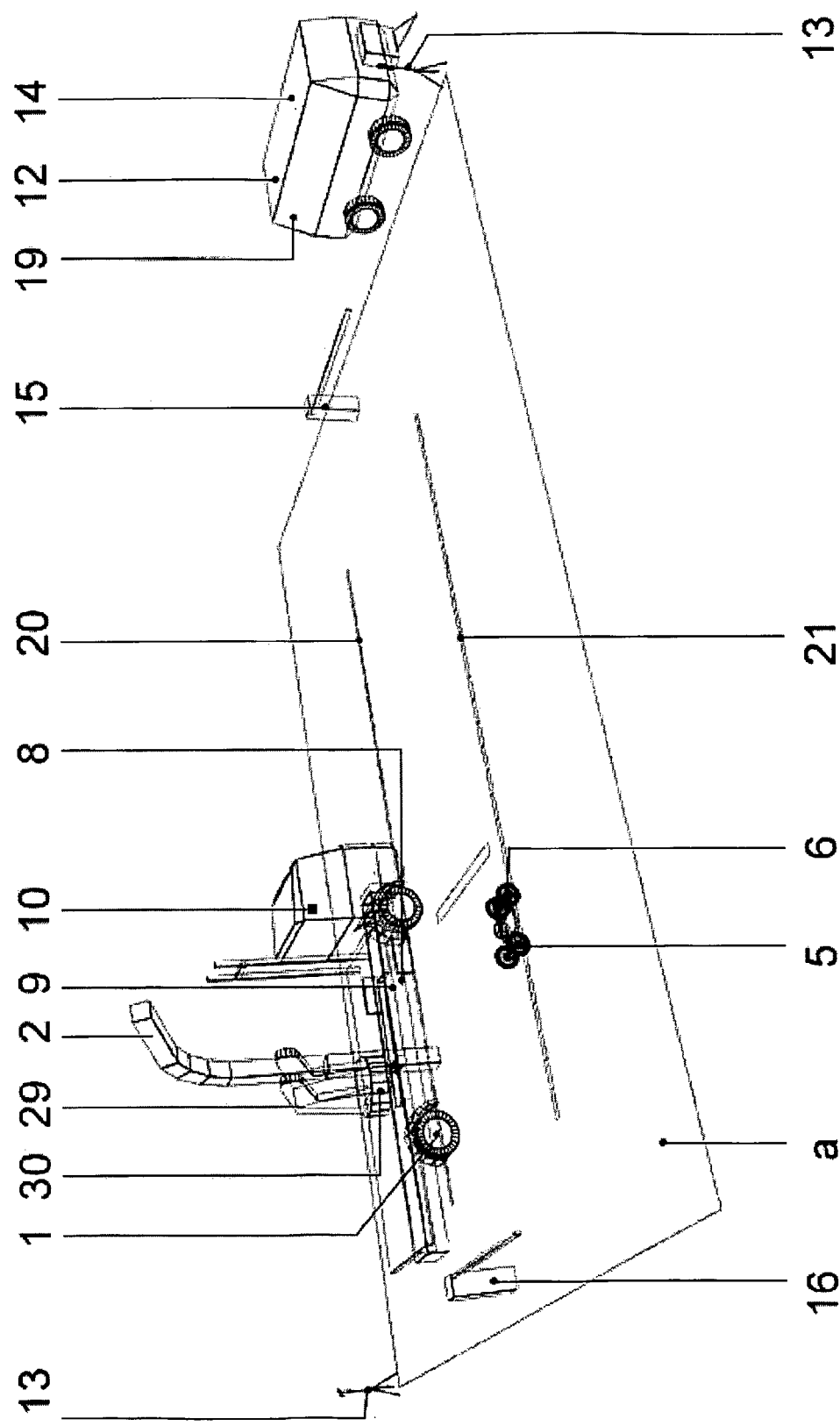

| | | | |
|---|---|---|---|
| 4,366,382 | A | 12/1982 | Kotowski |
| 4,430,568 | A | 2/1984 | Yoshida et al. |
| 4,599,740 | A | 7/1986 | Cable |
| 4,864,142 | A | 9/1989 | Gomberg |
| 4,870,670 | A | 9/1989 | Geus |
| 5,098,640 | A | 3/1992 | Gozani et al. |
| 5,237,598 | A | 8/1993 | Albert |
| 5,247,561 | A | 9/1993 | Kotowski |
| 5,638,420 | A | 6/1997 | Armistead |
| 5,692,028 | A | 11/1997 | Geus et al. |
| 5,692,029 | A | 11/1997 | Husseiny et al. |
| 5,764,683 | A | 6/1998 | Swift et al. |
| 5,838,759 | A | 11/1998 | Armistead |
| 5,847,398 | A | 12/1998 | Shahar et al. |
| 5,910,973 | A | 6/1999 | Grodzins |
| 6,249,567 | B1 | 6/2001 | Rothschild et al. |
| 6,272,207 | B1 | 8/2001 | Tang |
| 6,430,255 | B2 | 8/2002 | Fenkart et al. |
| 6,473,487 | B1 | 10/2002 | Le |
| 6,507,025 | B1 | 1/2003 | Verbinski et al. |
| 6,542,580 | B1 | 4/2003 | Carver et al. |
| 6,590,956 | B2 | 7/2003 | Fenkart et al. |
| 6,647,091 | B2 | 11/2003 | Fenkart et al. |
| 6,707,875 | B2 | 3/2004 | Fenkart et al. |
| 6,715,533 | B2 | 4/2004 | Kresse |
| 6,721,391 | B2 | 4/2004 | McClelland et al. |
| 6,768,421 | B1 | 7/2004 | Alioto et al. |
| 6,843,599 | B2 * | 1/2005 | Le et al. .................... 378/198 |
| 6,957,913 | B2 | 10/2005 | Fenkart et al. |
| 6,972,693 | B2 * | 12/2005 | Brown et al. .................. 378/57 |
| 7,062,074 | B1 | 6/2006 | Beneke |
| 2002/0110077 | A1 | 8/2002 | Drobot et al. |
| 2003/0076929 | A1 | 4/2003 | Hoheisel et al. |
| 2004/0017887 | A1 | 1/2004 | Le et al. |
| 2004/0084624 | A1 | 5/2004 | Meng et al. |
| 2004/0096030 | A1 | 5/2004 | Banchieri et al. |
| 2004/0125914 | A1 | 7/2004 | Kang et al. |
| 2004/0141584 | A1 | 7/2004 | Bernardi et al. |
| 2004/0247075 | A1 | 12/2004 | Johnson et al. |
| 2004/0258198 | A1 * | 12/2004 | Carver et al. .................. 378/57 |
| 2007/0165777 | A1 * | 7/2007 | Anwar et al. .................. 378/57 |
| 2007/0280416 | A1 * | 12/2007 | Bendahan et al. ............. 378/57 |

FOREIGN PATENT DOCUMENTS

| | | |
|---|---|---|
| CN | 1197209 A | 10/1998 |
| CN | 1295247 A | 5/2001 |
| CN | 1295248 A | 5/2001 |
| CN | 1378934 A | 11/2002 |
| DE | 4 218 693 A1 | 3/1993 |
| EP | 1 136 879 A1 | 9/2001 |
| EP | 1 056 046 B1 | 4/2004 |
| EP | 1 418 767 A2 | 5/2004 |
| EP | 1 424 552 A1 | 6/2004 |
| FR | 2 808 088 A1 | 10/2001 |
| GB | 2 277 013 A | 10/1994 |
| GB | 2 343 577 A | 5/2000 |
| GB | 2 368 764 A | 5/2002 |
| GB | 2 385 482 A | 8/2003 |
| HK | 1 036 835 B | 3/2004 |
| WO | WO 95/14245 A1 | 5/1995 |

OTHER PUBLICATIONS

*Rapiscan Systems: Cargo and Vehicle Inspection Systems*, 25 pages, Downloaded from the Internet: May 29, 2005 Archive, URL: http://web.archive.org/web/20050529032207/http://222.rapiscansystems.com/index.html.

* cited by examiner

NONINTRUSIVE INSPECTION METHOD AND SYSTEM

This invention relates to a nonintrusive inspection method and system, that radiographies containers, vehicles and train carriages without having to break seals, open containers or physical control.

The invention may be used for the scanning of vehicles, to create a radiography, that can be evaluated and from which to result the nature and quantity of the transported merchandise, to track down smuggling attempts or illegal transports of forbidden or undeclared products (drugs, explosives, weaponry, etc), for antiterrorist protection, by scanning all vehicles that have access in restricted areas, like airports, maritime and fluvial harbors, border crossing points, access to secure buildings, military bases, etc.

With the purpose of nonintrusive control several scanning methods are known, for which the following radiation sources:
  Gamma radiation sources, generated naturally by double encapsulated radioactive material like: Cobalt, Cesium, etc.
  X-ray generators or linear accelerators of X-ray, gamma radiation and neutrons The nonintrusive inspection system principle requires the irradiation of a detector area, linearly placed in front of a thin fan-shaped curtain of collimated radiation through which the scanned object is relatively moved. The detectors' electrical signals are analogically/digitally processed, to generate, line by line, a radiography to be displayed on a PC monitor. The relative movement of the scanned object is realized by moving the object relative to a fixed scanner, or by moving the scanner relative to a fixed object. The operation of the entire system is realized from a control cabin, placed close to the scanner, cabin for which extensive radiation shielding is mandatory.

This method has the drawback that it exposes the operators to the professional irradiation risk.

Currently, several nonintrusive scanning systems are known that include the technologies presented previously. One of these is the mobile imaging system with gamma radiation, GaRDS, manufactured by the American company RAPISCAN SECURITY PRODUCTS Inc. On this product, the radiation source is carried by a metal boom solidary with the chassis that is very expensive, heavy, that generates an important tipping moment and has the disadvantage of limiting the position of the radiation source to the maximum length of the boom. GaRDS, like all other mobile scanning systems, that are presently known, have the operator's cabin mounted on the chassis, exposing the crew of the system to the professional and accidental irradiation risks, risks eliminated by the present invention by building the operator's cabin on a mobile, tow able unit, that is placed outside of the exclusion area during scanning procedures, and controls all processes from distance by radio. Another major difference is that the known systems, including GaRDS, need a driver to operate the scanning unit, need eliminated in the present invention by implementing a subsystem for the automated control of speed and steering.

Other disadvantages of the known systems consist of the fact that they are heavy, being installed on vehicles capable of carrying heavy loads, with two up to four axles, necessary to bear the weight of the components and of the counterweights that compensate the tipping moment generated by the boom holding the radiation source at a lateral distance of minimum 4 meters away from the detectors area.

The operating of the known systems is very complicated, needing a minimum three person per shift crew, operator, driver and external supervisor, the last having the responsibility to direct the traffic of the vehicles that are to be scanned in the scanning area, as well as to prevent intrusion in the exclusion area, where the danger of irradiation exists.

The technical issue that is dealt by the present invention is the realization of a nonintrusive inspection method and system, that eliminates entirely the professional irradiation risk, by removing the operators cabin (the control centre) from the exclusion area and eliminating the need of a driver and external supervisor, by automation and remote operation of all processes deployed in the exclusion area and the limitrophe area. By implementing these automated processes, the reduction of personnel to one person per shift is possible.

The nonintrusive inspection method, according to the invention, eliminates the disadvantages mentioned above by that the vehicle that is to be scanned has access in the exclusion area through an automated traffic management subsystem that automatically commands the functioning of the barriers and of the entry/exit semaphores. The vehicle is placed in a marked spot, before its driver left the exclusion area (where there is the irradiation risk), then the protection of the exclusion area is activated, followed by the initiation of the scanning process by remote commands to the mobile scanning unit and the source carrier robot, when the radiation source is activated and the slow and constant motion movement of the two mobile units is started. These units are moving rectilinear and uniform on parallel trajectories framing the scanned vehicle. The source robot is moving synchronized with the mobile scanning unit. The movement of the mobile units is automatically controlled by electronic and informatics modules, connected with the control centre in a local area network, through radio modems, centre from which they receive commands, and towards which they send in real time status information and dedicated data. The stopping of the scan is performed automatically in the following situations, when the detector boom has passed the extremity of the scanned vehicle and the detectors receive the maximum level of radiation, at the end of the programmed scan length, when the protection limiter of the movement is triggered, when the protection of the exclusion area has been breached, when the proximity sensor has been triggered indicating dangerous distance between the detector boom and the scanned vehicle, when obstacles close to the guiding paths have been automatically detected by sensors placed on the mobile units. The stopping of the scanning process can be manually commanded by the operator in any moment. During this stage of the process, the image resulted from scanning the vehicle is displayed on the operator's monitor and at the end of the stage the protection of the exclusion area is automatically deactivated, and the vehicle may leave the scanning area. The two mobile units move back to the start position and the scanning cycle may be restarted.

The system that implements the method presented above, consists of a mobile scanning unit installed on an truck chassis, onto which a boom with detector areas specific to the radiation type used is mounted, a source robot carrier of a radiation source, both units being autonomous and having subsystems for the automated control of speed and steering, a positioning synchronization subsystem and a hydraulic propulsion subsystem to realize a rectilinear and uniform slow motion of the scanning unit. The system includes also a mobile control centre, that is placed outside of the scanning area and that remotely manages all processes, including a subsystem for acquisition, processing, storage and displaying of scanned image. The system also includes an exclusion area protection subsystem, an automated traffic management subsystem and a computer management subsystem.

The mobile scanning unit has a detector boom made up of the upper detector area mounted on a steel prop that can pivot round an axle, in a bearing solidary with a supplementary chassis and the lower detector area, the last being mounted independent in a oscillatory dogging, the two areas having separated folding systems during transport, but with unitary functionality during scanning operation.

The detector boom is made up of five segments oriented under different angles and is made out of light alloy assembled in the form of the letter "T".

In a first implementing variant, the subsystem for the automated control of speed and steering of the two units is built with an electric motor that drives the steering column and an electronic command module. The subsystem receives information about the units' relative positions to two guiding paths that must induce two parallel trajectories. The positioning information are received through some hardware/software modules M2$r$ and M2$s$ and processed through some M1$r$ and M1$s$ module, which supply the input for the positioning synchronization subsystem, connected to the chassis' and source robot's execution servo systems.

In another implementing variant, the subsystem for the automated control of speed and steering receives information regarding the relative position to a fixed network of laser reflectors, from some rotating beam laser sensors placed on the two mobile units, through M2$r$ and M2$s$ hardware/software modules and processes them through the M1$r$ and M1$s$ modules, supplying the input for the positioning synchronization subsystem, connected to the chassis' and source robot's execution servo systems.

The hydraulic motion subsystem that drives the chassis in slow motion, is made out of a gearbox for combined drive subsystem that has a revelation sensor, a hydraulic motor, a variable flow capacity hydraulic pump controlled by an electronic module, commanded by an automated motion control dedicated software application.

The automated traffic management subsystem is endowed with some barriers and traffic lights commanded by radio, directly by a dedicated software application and the exclusion area protection subsystem is made out of some motion detection active sensors, a control module for the sensors' status and an emergency automated radiation source shutdown module in the case that the exclusion area has been breached.

The subsystem for acquisition, processing, storage and displaying of scanned image is made out of some preamplifier modules to which the detectors are connected, some multiplexer modules, some analogue-digital converters, some microcontrollers, a CAN bus, some CAN modules, a CANi communication interface with a processing unit that runs a dedicated software application, connected through wireless LAN to another processing unit that runs another dedicated software application in order to display on a monitor the resulted radiography.

The invention has the following advantages:
elimination of professional irradiation risk of the operators as well as the risk of accidental irradiation of the possible intruders in the exclusion area;
the reduction of the personnel from minimum three per shift, to one person per shift;
increased system mobility, flexibility and manoeuvrability;
increased automation;
increased productivity, higher number of scan vehicle over time unit, by automating processes and diminishing the idle time by computer managing the processes;
obtainment of a low constant scanning speed, essential to have a maximum penetration a good quality image without geometric distortion;
precise control of speed and traveled distance in a set time range;
the preservation of the dynamic performances of the chassis in "transport mode";
significant reduction, with over 20% of the system's total weight with positive effects in the reduction of the tipping moment and the torsion stress within the chassis;
significant reduction, with over 30% of specific consumptions of energy and fuel;
capability of a later analysis of the functioning parameters and/or possible undesired events by implementing a "black box", similar to those used in aviation, that automatically records all commands, feedback and system's functioning parameters.

Figure 2:
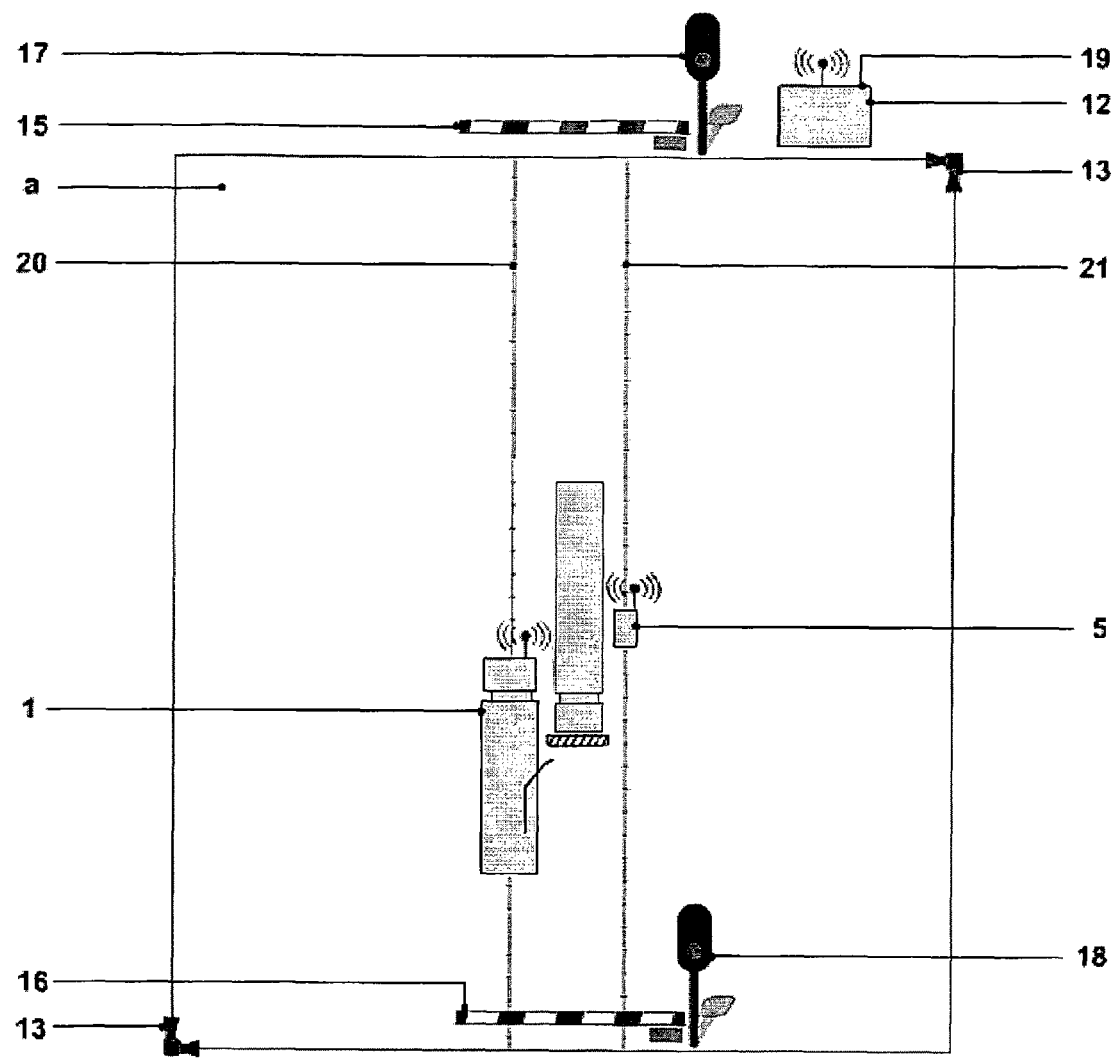
Figure 3:
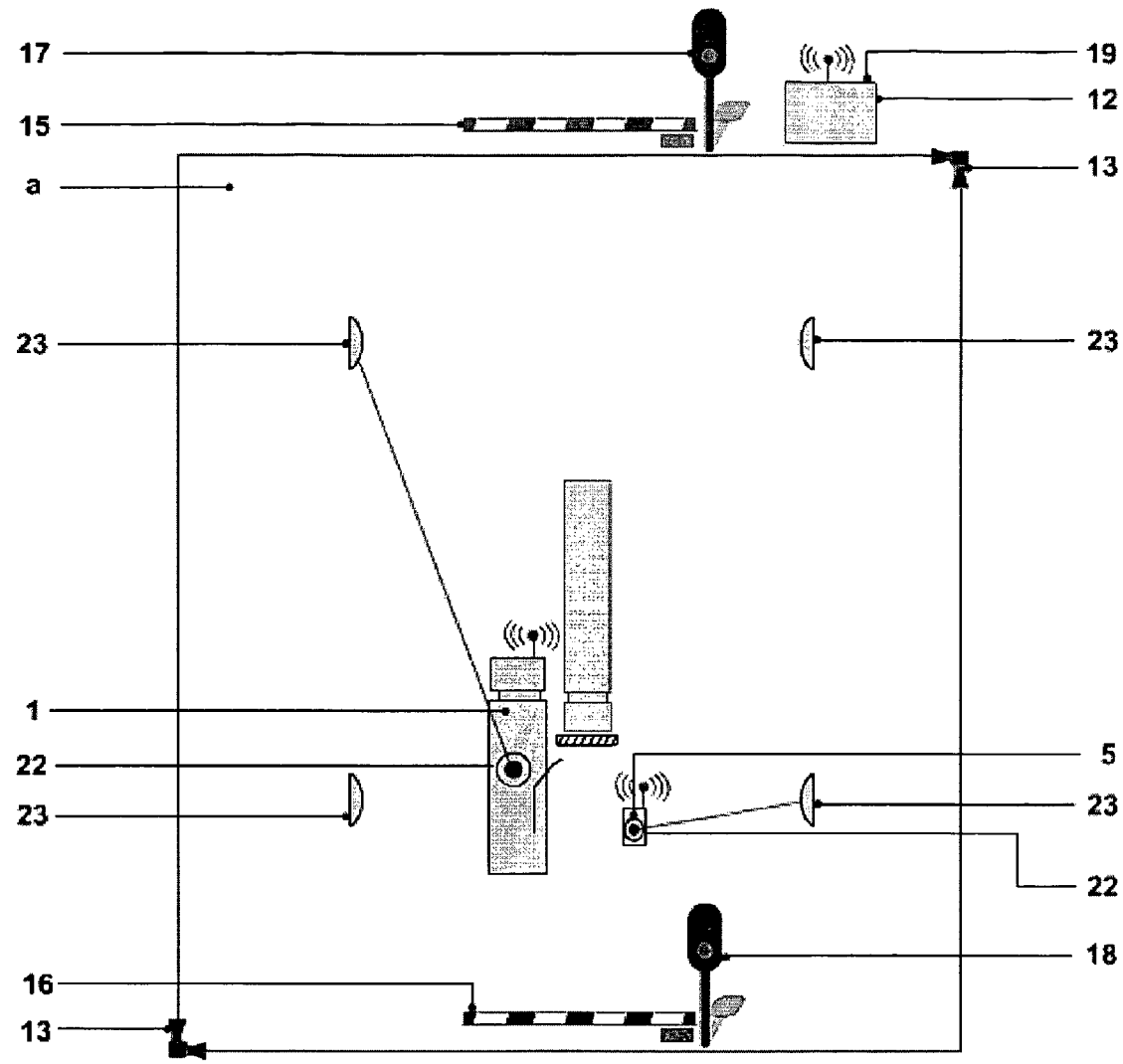
Figure 4:
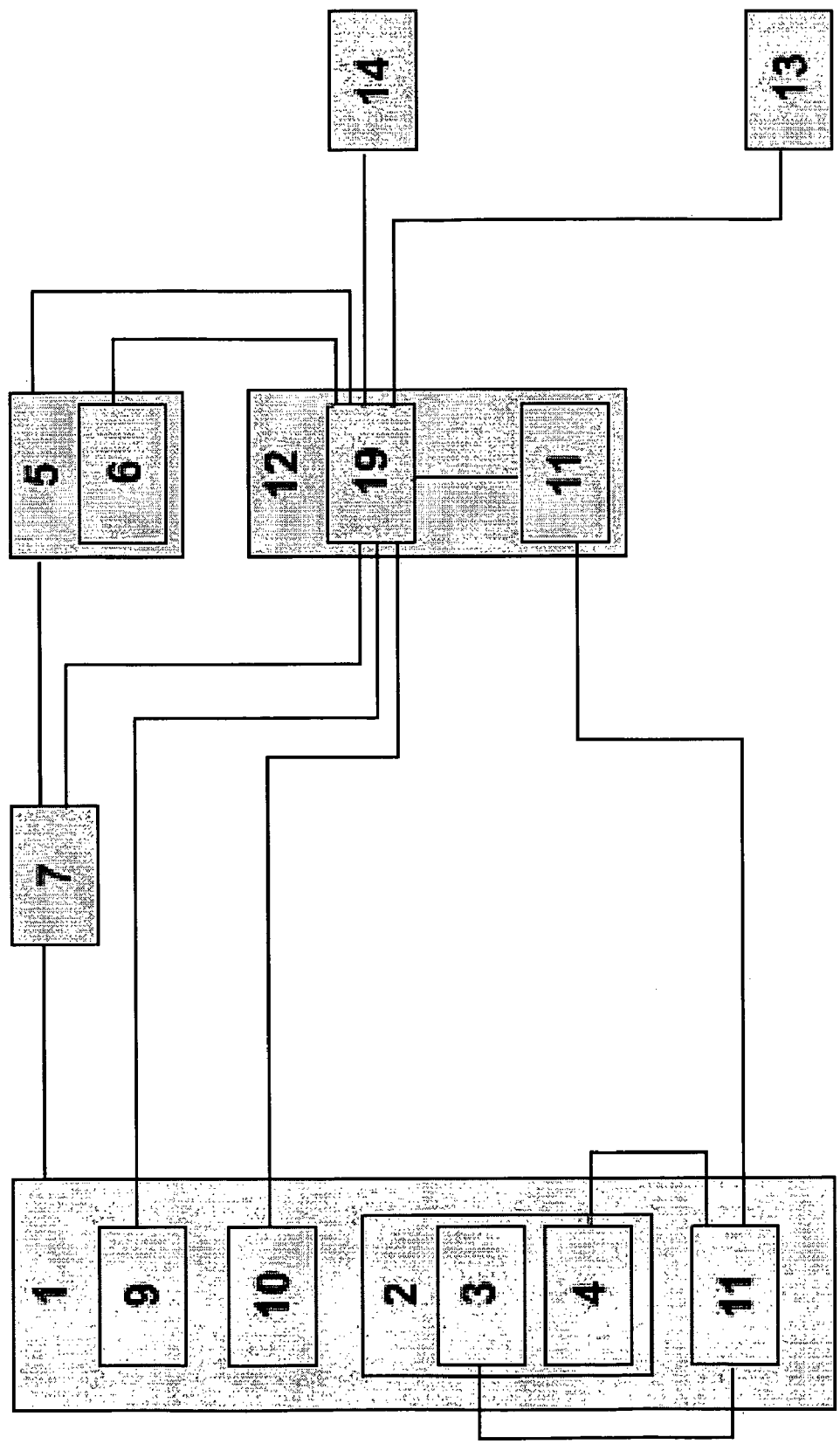
Figure 5:
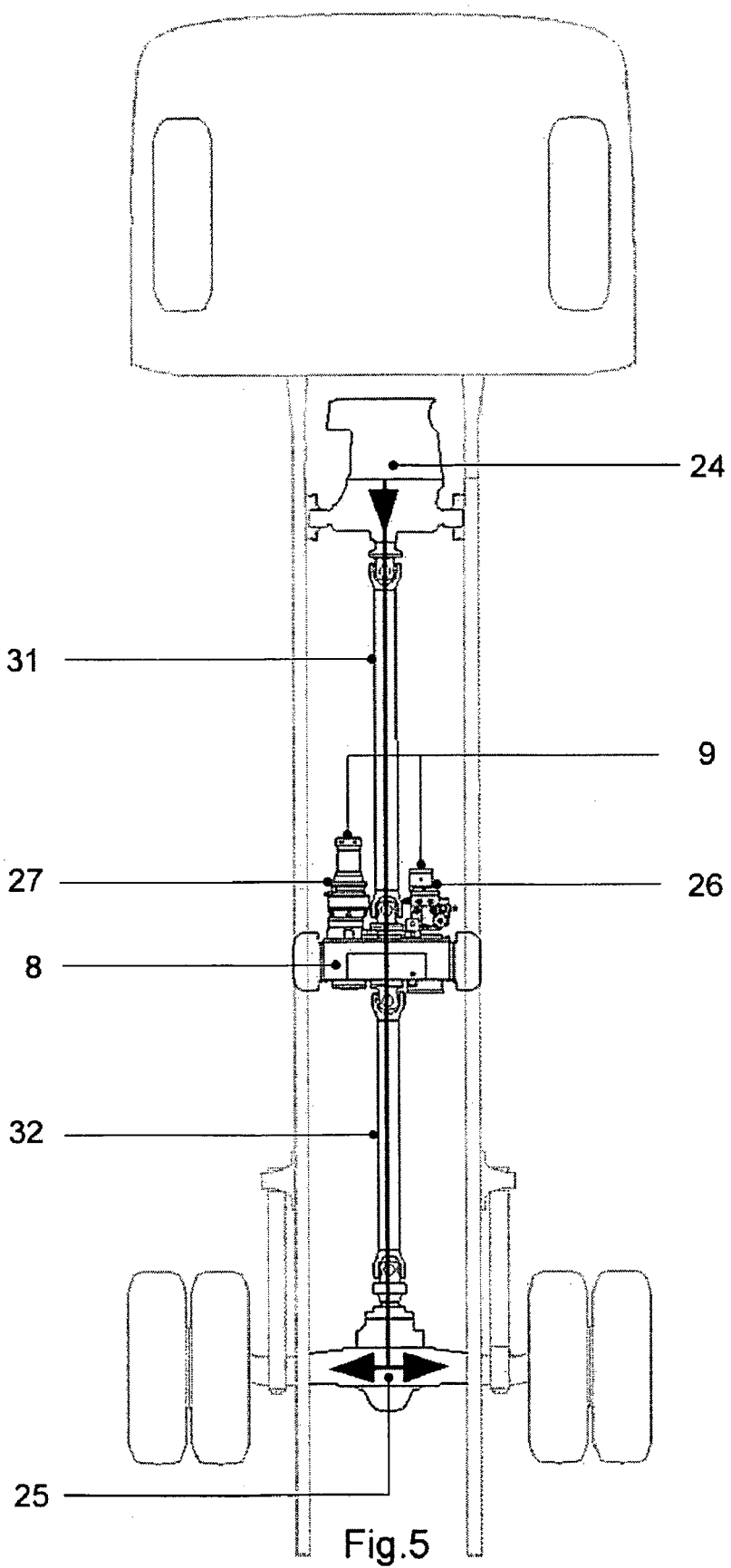
Figure 6:
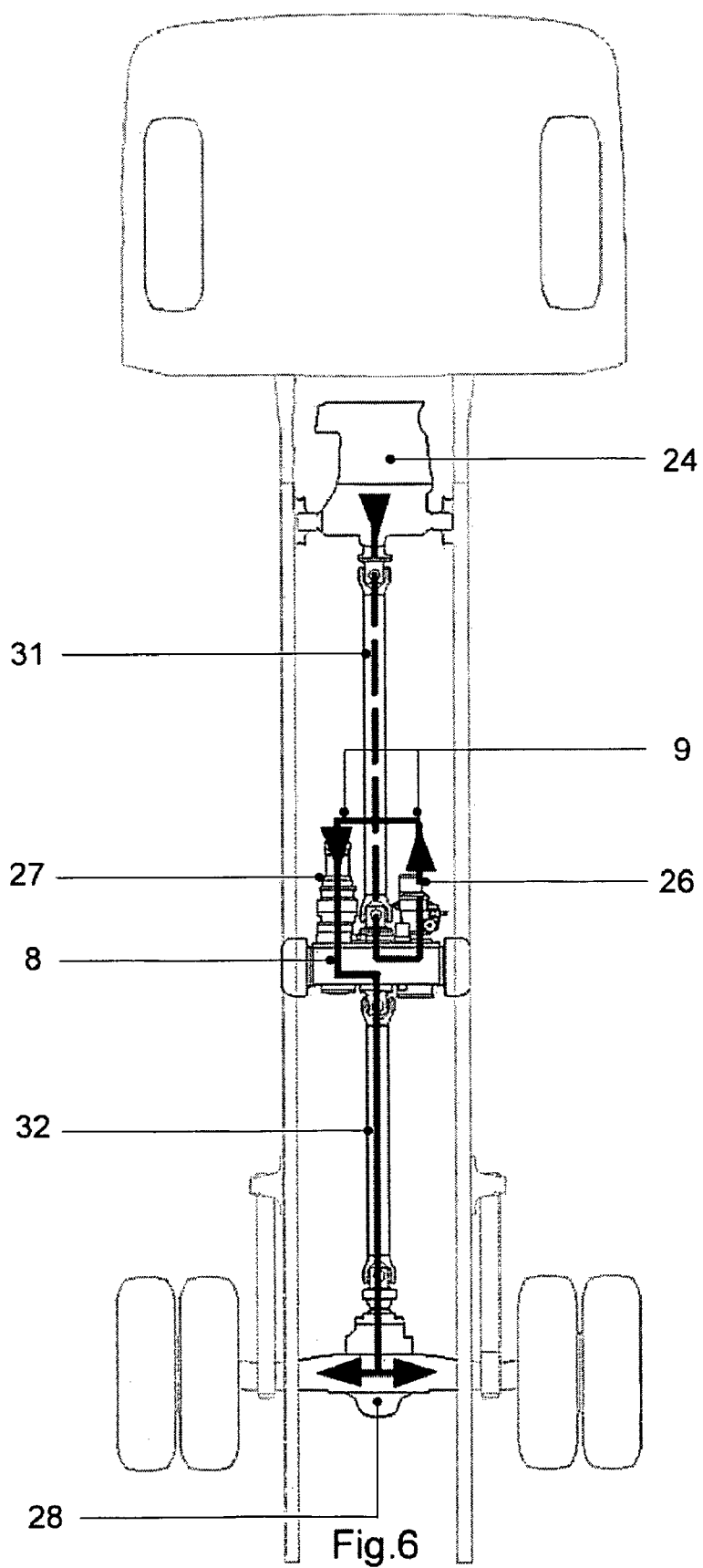
Figure 7:
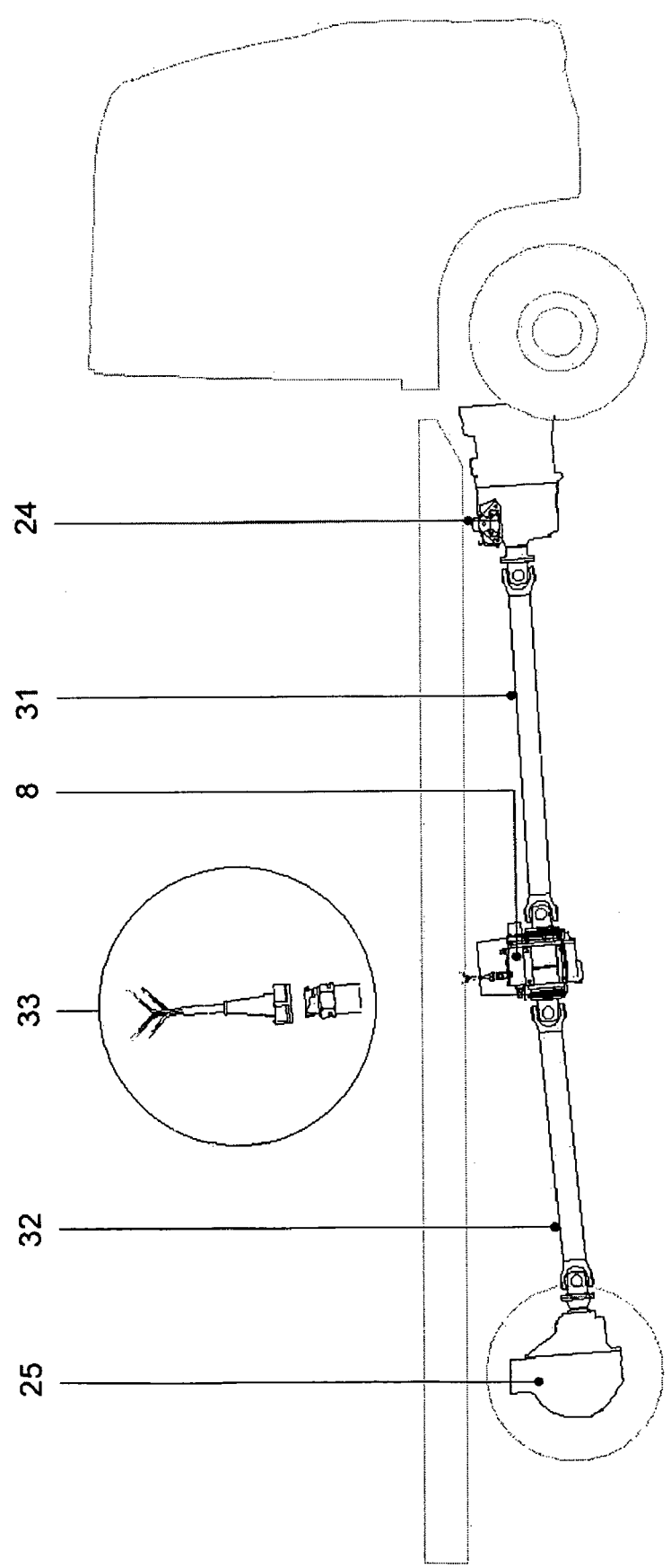

Further is presented an example of implementing of the invention in connection with the figures from 1 to 13 that describe:

FIG. 1, perspective view of the nonintrusive inspection system, according to the invention, placed within the exclusion area;

FIG. 2, overview of system and exclusion area, according to the invention, with the implement variant of guiding paths;

FIG. 3, overview of system and exclusion area, according to the invention, with the implement variant of rotating beam laser sensors;

FIG. 4, nonintrusive inspection system diagram, according to the invention;

FIG. 5, schematics overview of the driving train when using mechanical direct drive FIG. 6, schematic overview of the driving train when using the hydraulic pump of the gearbox for combined drive interpolated between the output shaft of the gearbox and the input shaft of the rear axle;

FIG. 7, schematic lateral view, of the gearbox for combined drive

Figure 8:
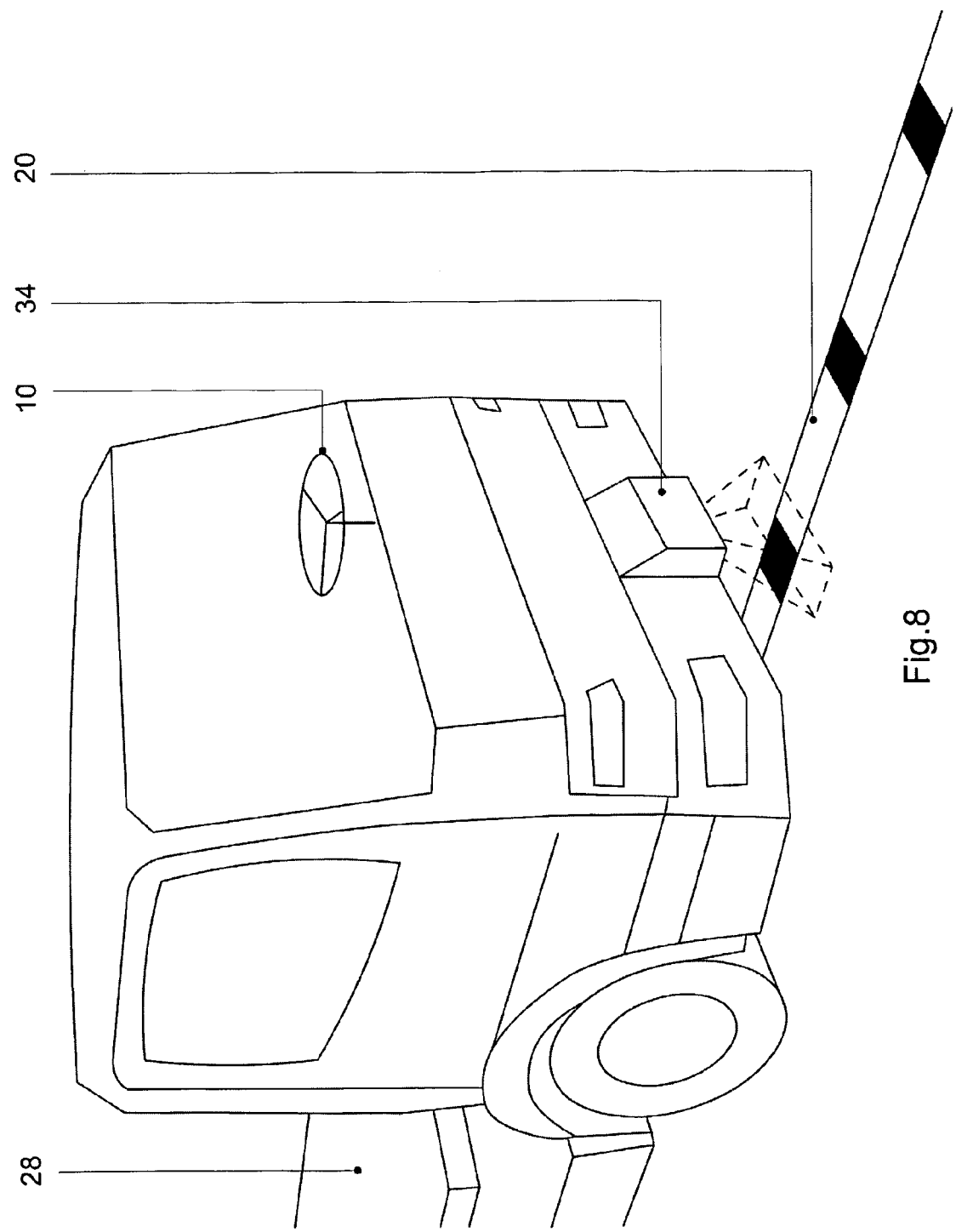
Figure 9:
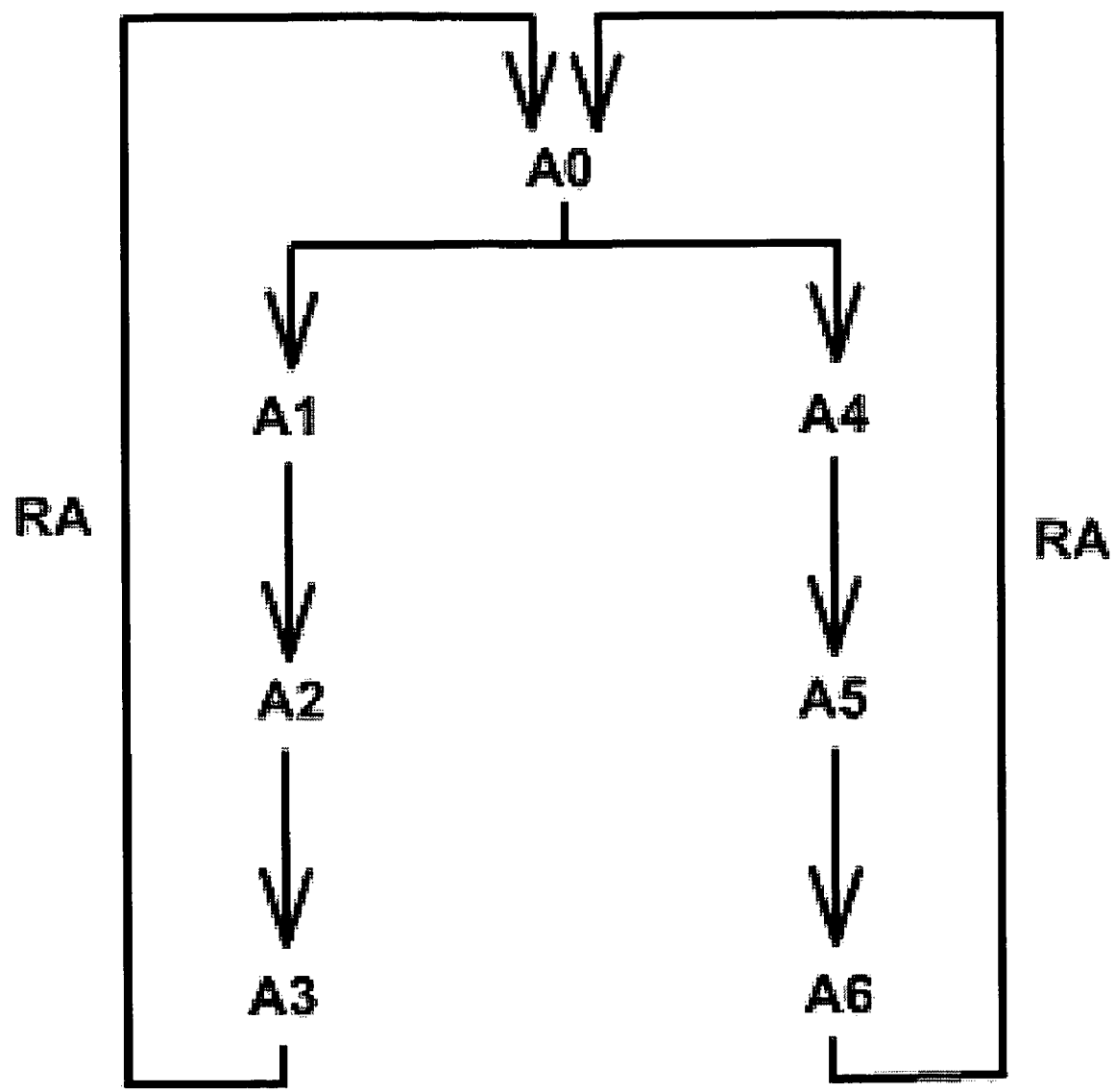
Figure 10:
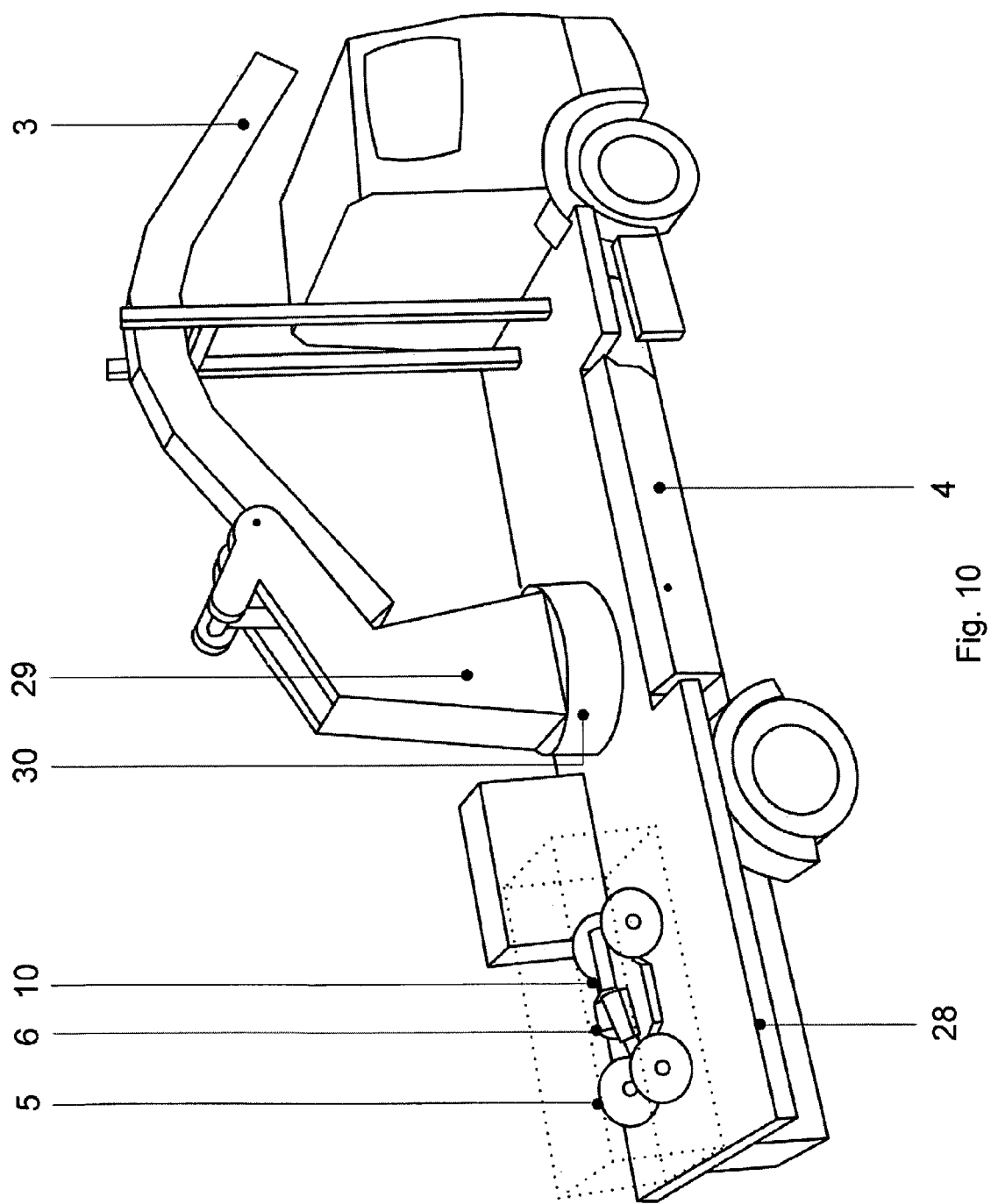
Figure 11:
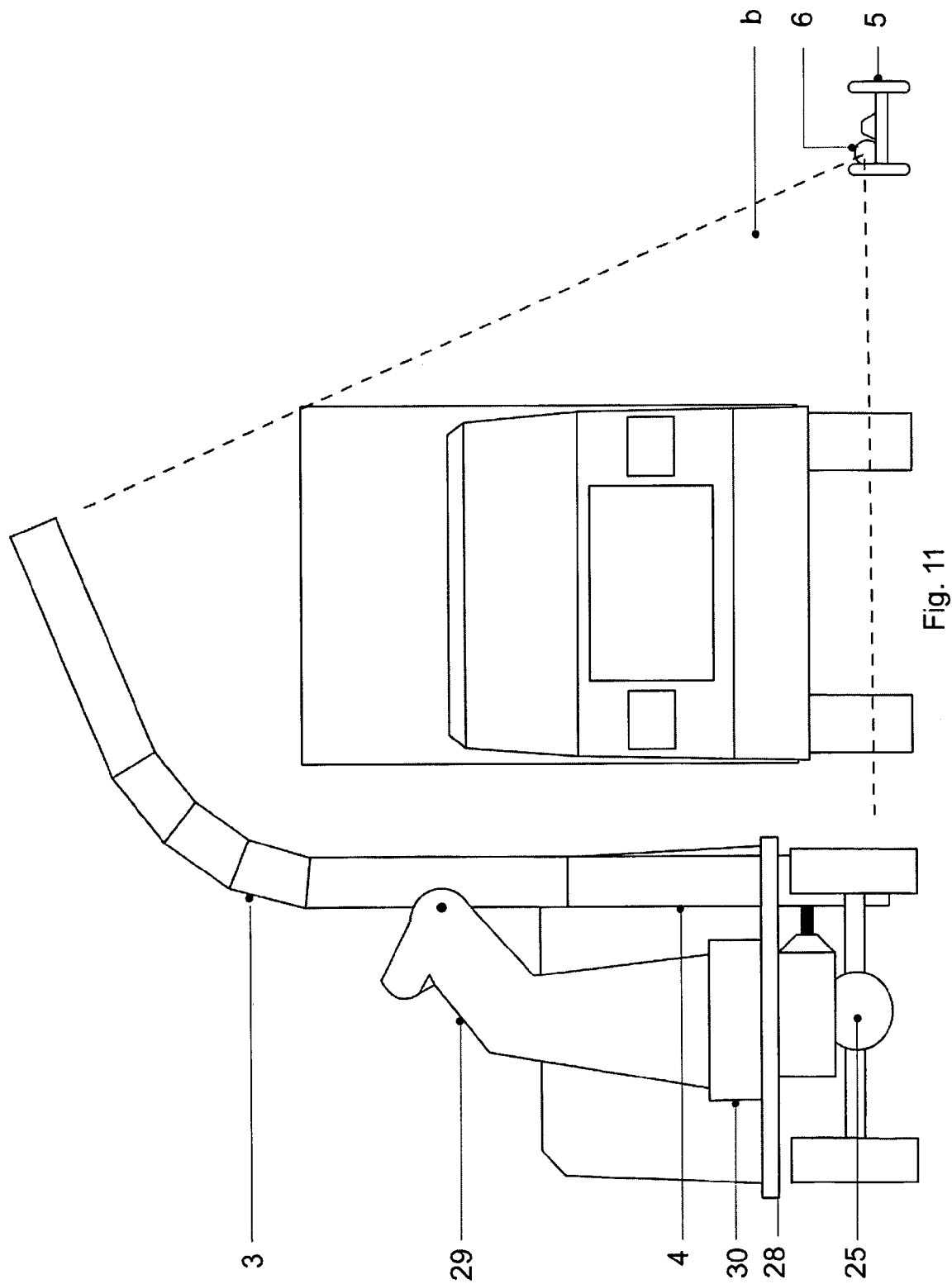
Figure 12:
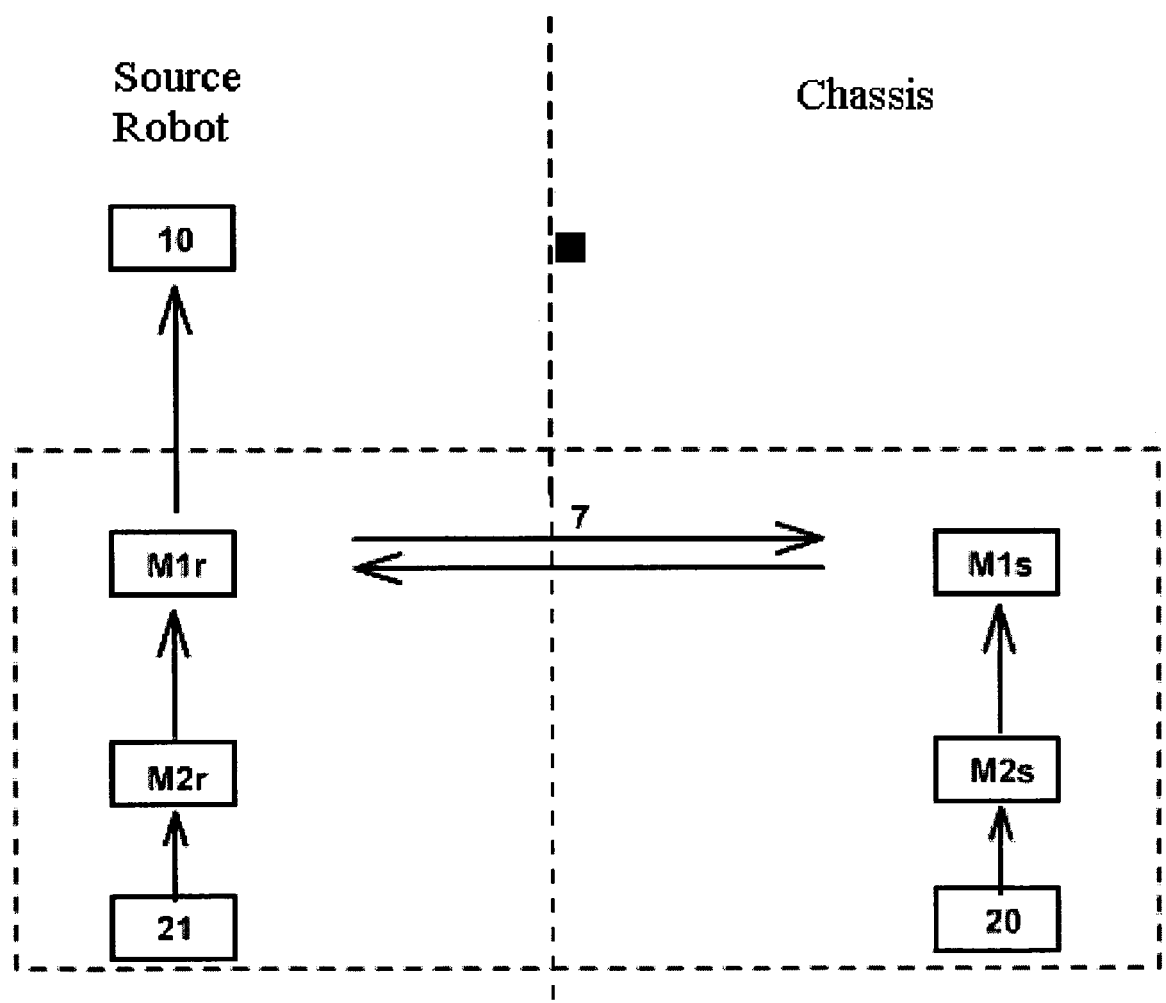
Figure 13:
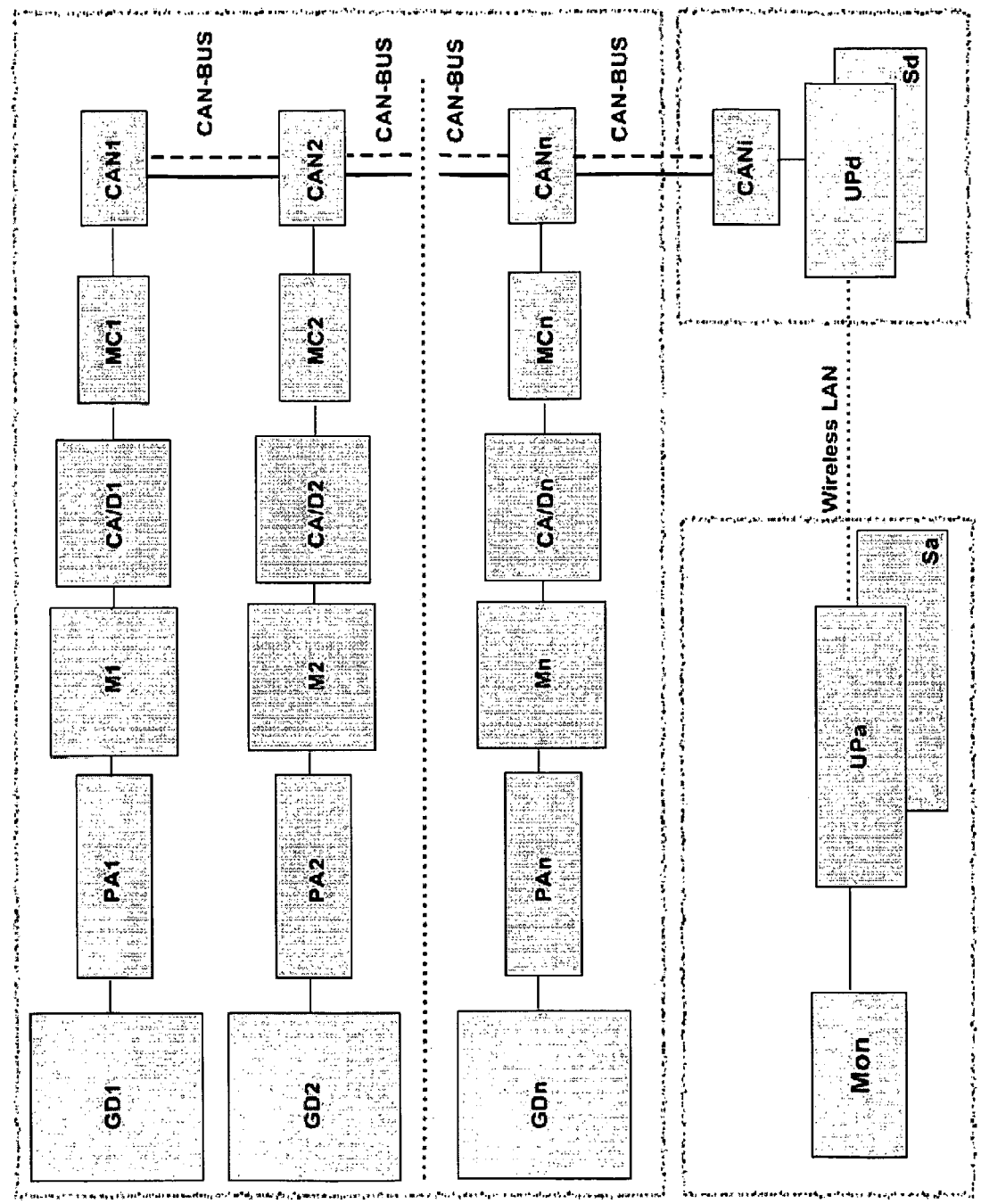

FIG. 8, overview of the systems cabin with the subsystem for the automated control of speed and steering, in the implementing variant of the guiding paths;

FIG. 9, subsystem for the automated control of speed and steering diagram;

FIG. 10, overview of the chassis in transport mode;

FIG. 11, view from the back of the mobile units in scanning position;

FIG. 12, positioning synchronization subsystem diagram;

FIG. 13, subsystem for acquisition, processing, storage and displaying of scanned image diagram;

The nonintrusive inspection method has the following steps:
the vehicle that is to be inspected is brought up to the entry barrier in the scanning area;
the driver of the vehicle steps out of the vehicle and hands over the transport's documents;
entry in the scanning area is allowed, the entry barrier is raised and the entry traffic light is switched on green, and the exclusion area protection subsystem is deactivated;
the driver positions the vehicle in the scanning area, in the marked spot and leaves the exclusion area;
the exclusion area protection subsystem is activated;
the operator, initiates the scanning process from the control centre by radio transmitting the command to the mobile scanning unit;
the radiation source is activated and the slow motion of the scanning unit is initiated. The system moves rectilinear with constant speed along the inspected vehicle. The source robot moves rectilinear and uniformly synchronized with the scanner, on a parallel trajectory, so that the inspected vehicle is placed between the source robot and the detector's area. The two vehicles are energetically independent, but synchronized with each other and both with the scanning lane. The speed of the units are controlled automatically by electronic and informatics modules on board of each unit mobile unit. These modules are radio connected, through radio modem in the LAN with the control centre from which they receive commands and to which they send feedback;

the scan is automatically stopped in the following situations:
- if the detector boom passed the inspected vehicle's extremity, so the imaging system receives a series of white lines meaning maximum level of radiation on all detectors;
- at the end of the programmed scanning length;
- if the length limitation system has been triggered;
- if the protection of the exclusion area has been breached;
- when the distance between the detector boom and the inspected vehicle is dangerously small, the proximity sensor that measures that distance triggers;
- on the automatic detection of obstacles in the proximity of the guiding paths, by the sensors placed in the front and back of the mobile units;

all documents regarding the transport are scanned and stored in a database;

the radiography of the vehicle is displayed on the monitor in the control centre;

at the end of the scanning phase, the protection of the exclusion area is deactivated;

the driver of the inspected vehicle receives back the transport's documents;

the exit barrier raises, the exit traffic light turns green and the vehicle leaves the area;

the exit barrier returns and the cycle can be restarted;

a file that contains the radiography and the real image of the vehicle as well as copies of all documents concerning the transport is created and stored with a unique identity.

The nonintrusive inspection system, according to the invention, is a mobile ensemble of radioactive scanning, installed on an autonomous chassis 1, light with a metallic boom 2 built on it, made of steel and light alloy, composed of five angular segments, articulated and driven by hydraulic cylinders. On the boom 2, there is an upper detector area 3 and a lower detector area 4, therefore the metallic boom 2 will be referred from this point forward detector boom.

On a mobile unit that will be referred from this point forward, source robot 5, there is a radiation source 6.

The source robot 5, is connected to a positioning synchronization subsystem 7 which synchronizes the position of the source robot 5 with the autonomous chassis 1, the subsystem 7 having reference elements on the autonomous chassis 1 and on the ground.

On the autonomous chassis 1, a gearbox for combined drive subsystem 8 is mounted, onto which a hydraulic motion subsystem 9 is mounted for movement of the autonomous chassis 1 with low speed, electronically controlled, during scan. For keeping the straight-line motion of the autonomous chassis, the nonintrusive inspection system has a subsystem for the automated control of speed and steering 10.

A subsystem for acquisition, processing, storage and displaying of scanned image 11, receives signals and data from the radiation detection areas mounted on the detector boom 2, digitizes the data and transmits it, through the radio modem, to a mobile control centre, where a radiographic image of the scanned object is created. This image is analysed by the operator and stored electronically.

Because in the scanning area a radiological protection against accidental irradiation of possible intruders must be insured, an exclusion area protection subsystem is provided, which establishes a rectangular excluding area a and is connected with an automated traffic management subsystem 14, which administrates the peripherals for access control in the scanning and limitrophe area, of the vehicles which are to be scanned. The peripherals are an entry barrier 15, an exit barrier 16, an entry semaphore 17 and an exit semaphore 18.

A computer management subsystem 19, commands and controls from distance all the subsystems of the entire assembly: the steering, engine revolution and the position of the autonomous chassis 1 in the exclusion area a, of the source robot 5, and all others peripherals connected in the system, according to the invention, communicating with all these in a wireless LAN.

All physical components of the computer management subsystem 19, and the operator post are installed in the mobile control centre 12, which is towed during transport by the autonomous chassis, and is placed outside the exclusion area a in the scanning mode.

In a first implementing variant (FIG. 2), inside the exclusion area a, on the scanning direction, some guiding paths 20 and 21 for controlling the movement of the autonomous chassis and the source robot 5 are installed.

In another implementation variant (FIG. 3), the subsystem for the automated control of speed and steering 10 may be designed with some rotating beam laser sensor 22, a fixed network of laser reflectors 23 set in the exclusion area a and a software application for processing the data, computing the orientation and position parameters and taking correcting actions for steering and speed.

The inspection system, according to the invention, mounted on the autonomous chassis 1 has two modes of physical modes, "scanning mode" and "transport mode". The transition from one mode to another is done by operating some hydraulic cylinders which are reconfiguring the components' positions.

In the "transport mode" the detector boom 2 is folded along the autonomous chassis 1 in order to assure the legal overall dimension for transport on public roads and a good repartition of the load on the axles. The source robot 5 and the components of the automated traffic management subsystem 14 are raised on the autonomous chassis 1 platform, in special containers, and mechanical ensured. The mobile control centre 12 is towed by the autonomous chassis 1 and the gearbox for combined drive subsystem 8 is switched in transport position, with direct shaft connection between a gearbox 24 and a motor axle 25.

In the "scanning mode" the detector boom 2 is laterally extended, to the right, almost perpendicularly on the axle of the autonomous chassis 1, and the source robot 5 is placed laterally to the right, parallel with the longitudinal axle of the autonomous chassis 1. The barriers 15, 16 and semaphores 17, 18 are placed in the entrance and exit points of the exclusion area a and the mobile control centre 12 is placed near the entrance in this area. The gearbox for combined drive subsystem 8 is switched to "scanning mode", meaning the shaft output from the gearbox 24 is moving a hydraulic pump 26, joined with a hydraulic motor 27, which is connected directly, mechanically with the motor axle 25.

The autonomous chassis 1 must be one homologated according to the international standards to allow transport on public roads without needing a special transport authorization. The autonomous chassis 1 has a supplementary chassis 28, made of steel, on which all the components of the mobile scanning unit are joined, respectively, the two areas 3 and 4 of the detector boom 2, the enclosed parts of the hydraulic system as: oil tank, the distributors, adjusting and securing circuits, the source robot's transport container, the lockers with electrical and electronic circuits, the lockers in which the barriers, semaphores and guiding elements are transported and the generator. Some of these assemblies do not figurate, because are well known and unclaimed components.

The detector boom 2 is made of steel prop 29 that can pivot on an axle, in a bearing 30 solidary with the supplementary chassis 28. On this prop 29 the upper part of the detector boom 2 is mounted, in an oscillatory joint, made from a five segment, "T" shape, light alloy structure.

The preferred constructive solution is the use of one detector boom 2 made of five segments. The vertical segment is constructed in two parts: the lower detector area 4, mounted independently, laterally to the right, on the supplementary chassis 28, in an oscillatory fix in a perpendicular bolt on the longitudinal axle of the chassis and the upper detector area 3, mounted on the pivoting steel prop 29. The strength structure of the detector boom 2 is made of light alloy sheet, assembled in "T" shape.

Depending on the chosen radiation source, the system, according to the invention, will include the detector areas 3 and 4, in order to transform the radiation received in electrical signals which are then processed and transformed in radiographic images of the scanned object. For an X-ray source hybrid detectors with scintillation crystals and photodiodes or monolithic detectors with jointed load circuits will be used. For a gamma radiation source hybrid detectors with scintillation crystals jointed with photomultiplier tubes will be used. For a neutron source hybrid detectors with scintillation crystals having a very fast response and great efficiency jointed with photomultiplier tubes will be used.

All hybrid detection systems are using photodiodes or photomultiplier tubes that have maximum sensibility for the visible band to which the scintillation crystals have a maximum response to the type of radiation used.

The placement of the detectors may be done depending on the combination source-detector and the constructive variant of the detectors, on a line or two or in matrixes of different forms.

The source robot 5 is made of a vehicle specially built for this application, autonomous and remotely commanded which has the role to carry the radiation source 6, with low and constant speed, electronically synchronised with the movement of the autonomous chassis 1 on a parallel trajectory.

The propulsion of the robot 5 is electrical and his autonomy is assured by batteries and an electric generator, elements that do not figurate. The speed and direction of motion of the robot 5 are adjusted by self assisted systems by microcontrollers which communicate wireless with the control centre 12 and the autonomous chassis 1. The relative positioning between the source robot 5 and the autonomous chassis 1 is assured by the positioning synchronization subsystem 7, having as reference elements fixed points on the autonomous chassis 1.

The radiation source 6 is fixed on the chassis of this mini-vehicle, which is the robot 5, in a way that a radiation curtain b to be collimated on the detector area 3 and 4.

In the "transport" mode the source robot 5 is loaded on the platform of the chassis 1 in a specially made container according to the radiological security standardizations. The access on the chassis' 1 platform is assured by a hydraulic elevation platform, which does not figurate that also insures the secure locking of the transport container. The controls for the direction and speed of motion are available at the level of the robot 5 in order to handle it during independent movements like the climbing on the autonomous chassis 1 or initial positioning in the scanning area.

The positioning synchronization subsystem 7 is used for synchronisation of the speed and position of the source robot 5 with the chassis 1. The subsystem 7 is made of one hardware/software module M1r, placed on the source robot 5 and another hardware/software module M1s placed on the chassis 1; the modules exchange data about the speed and the position in the scanning lane. Beside these modules M1r and M1s, there are another two hardware/software modules M2r and M2s that are permanently monitoring the position of the two mobiles, the autonomous chassis 1 and the source robot 5 and sends them commands.

The positioning synchronization subsystem 7 (FIG. 12) functions in the following way: the modules M2r and M2s are retrieving data regarding their position in the scanning lane through digital analysis of a video image showing a guiding path 20 and 21 or from a rotating beam laser sensor 22 which reflects successively in the fixed network of laser reflectors 23 placed in the exclusion area a according to FIG. 3. On every actualisation of position in the perimeter, the modules M2r and M2s offer the position of each mobile unit to the modules M1r and M1s. Between modules M1r and M1s there is a permanent connection, through which information about the position of the mobile units are transmitted. Depending on the information received, the modules M1r and M1s decide to synchronise the motion of the source robot 5 with the dynamic parameters of the autonomous chassis 1, this decision being transmitted as an execution command to the subsystem for the automated control of speed and steering 10.

The radiation source 6 used in the nonintrusive inspection system, according to the invention, may be made of double encapsulated radioactive material, X-ray generator or linear accelerator for gamma ray or neutrons.

In an implementing variant, the radiation source is made out of double encapsulated radioactive material, for example Co60. The choice of the radioactive material—in the case of Co60 the energy is 1.3 MeV, and source activity of 1 Currie—is made depending on the desired penetration and the available exclusion area a dimensions. The capsule containing the radioactive material is surrounded by a thick screen that absorbs the radiation when the source is not activated.

The sizing of the screen is made in accordance with international standards. In this screen a fan-shape cut with an angular opening of 80 degrees is made, in order to collimate a radiation curtain b at a width of approximately 18 cm on the detector areas 3 and 4, having placed the radiation source 6 at a distance of five meters from the detector boom 2. The activation of the source 6 will be made through a pneumatic or electric actuator system.

The system used, must ensure the automatic retreat of the radioactive capsule in order to stop the radiation, if the actuator would be defective. The activation of the source 6, is signalled acoustically and optically in order to warn the operator and any one of the presence of radiation in the exclusion area a.

The neutron accelerator generates pulses of fast neutrons. Depending on the detectors' response, the atomic number of the substances present in the scanned object can be determined.

The hydraulic propulsion subsystem 9, allows the chassis 1, to move with low and constant speed between 0.15-0.85 m/sec. The subsystem 9 uses the gearbox for combined drive subsystem 8, mounted on the chassis 1, between the driver shaft 31, of the gearbox 24, and the driving shaft 32, of the motor axle 25. This gearbox 8, allows the switch of the mechanical power output from the driving shaft 31 of the gearbox 24, directly to the motor axle 25, in "transport mode" or to the hydraulic pump 26, in "scanning mode".

In "transport mode", the driving shaft 31, of the gearbox 24, is connected directly and mechanically in a 1:1 ratio, through the driving shaft 32, to the motor axle 25, without modifying the power, torque or speed of the chassis 1.

In "scanning mode", the driving shaft 31, of the gearbox 24, is connected mechanically in a set ratio with the hydraulic pump 26. The flow of the hydraulic pump is commanded by the operator's software application, through a dedicated module that does not figurate, and the hydraulic pump 26, is hydraulically connected in a closed circuit, with the hydraulic motor 27, which is mechanically connected with the motor axle 25.

Through the variable command of the pump flux 26, a variation of the speed is obtained even when the revelation of the driving shaft 31, of the gearbox 24, is constant. The gearbox for combined drive subsystem 8 has a revelation sensor 33, which sends impulses to the software application proportionate with the revelation of the hydraulic motor 27, so the software application can calculate precisely the speed of the chassis 1 and therefore, the distance traveled in a set time table. Based on the result of these calculations, corrections will be applied in order to insure the motion's uniformity.

The chosen constructive solution, allows variable speed commands in a wide spectrum (0.15-0.85 m/s), at very low absolute speed values, impossible to reach using conventional transmission gears trains and without altering the dynamic performances of the chassis 1, when travelling in "transport mode" on public roads.

The subsystem for the automated control of speed and steering 10 for the source robot 5 is designed to control and command the steering and motion of the source robot 5 synchronized with the speed of the chassis 1.

The control of the steering for the two mobile units can be either mechanically, electronically or mix.

The mechanical implementation variant uses some guiding tracks made from longitudinal profiles assembled in prolongation, that do not figurate, on which the mobile units 1 and 5 move.

The electronic control is realized, using rotating beam laser sensors 22, which track the network of fixed laser reflectors 23, and commands a steering servo system. This implementing variant includes hardware and software modules for automatic processing and deciding.

The mix control combines the two modes described before and is done using optical (laser), magnetic or video sensors, that track the guiding paths 20 and 21, on which there are guiding marks. Software and hardware modules command a steering servo system automatically.

One possible mix implementing variants of the subsystem for the automated control of speed and steering 10, is realized with some video cameras 34, placed on the vehicles' bumpers in front and back, processing units and dedicated software applications, light sources for enhancing the view of the guiding paths 20 and 21, and steering servo systems. On the guiding paths there are guiding marks at relative short distances, under 1 m, which serve as correction markers in case there are deviations from the programmed speed.

The subsystem for the automated control of speed and steering described in FIG. 9 performs in the first step positioning and orientation data acquisition A0, followed by interpretation of the orientation data A1, steering command generation A2, steering command execution A3, interpretation of the positioning data A4, speed command generation A5, speed command execution A6 and feedback of the performed action RA.

Acquisition of the data for positioning and orientation A0 has the purpose to receive data from the hardware/software modules M1$r$ and M1$s$, video camera 34 or a positioning subsystem, made by two rotating beam lasers sensors 22 and a fixed network of laser reflectors 23, placed in the exclusion area a. The received data is divided in order of their relevance into orientation data and speed data.

Through the interpretation of the orientation data A1 received, possible deviations from the programmed trajectory are reported. Based on the information about the deviation from the normal trajectory, a steering command A2 is generated, that will operate the steering shaft, through the servo system which will execute the steering command A3. The process receives feedback of the performed action, and so, after every command it analyzes the impact over the orientation parameters, the RA information.

Through the interpretation of the positioning data A4 received, the deviations from the correct position are detected, as well as the synchronizations of the two mobile units. Depending on the recorded position deviations, a speed command will be generated which will be transmitted to the synchronization subsystem 7 on the autonomous chassis 1 or to the electric traction system of the source robot 5.

The operating mode of the subsystem for the automated control of speed and steering 10 in the implementing variant of laser guided operation will be: during the movement of the rotating beam laser sensors 22, placed on the autonomous chassis 1 and on the source robot 5, they emit one laser beam which will be reflected successively by the fixed network of laser reflectors 23. The dedicated software application described in FIG. 9, analyzes the received information, takes the decision to command the servo steering to eliminate the deviation if that is the case, and if the error in synchronization between the speed of the source robot and the chassis is not within the set limits, sends a command correction to the subsystem for the automated control of speed and steering 10.

The subsystem for acquisition, processing, storage and displaying of scanned image 11, is composed from a series of hardware equipment and software applications, according to the diagram from FIG. 13 and it's designed to collect, process, analyze and interpret the radiation signals from the detectors, in order to generate a radiography of the scanned object.

The subsystem 11 is has n groups, each of 16 radiation detectors GD1 . . . GDn, every group being connected to one electronic module, that includes a preamplifier with 16 parallel channels PA1 . . . PAn, which signals are multiplexed in one of the M1 . . . Mn multiplexers, and then converted analogue-digital in one of the CA/D1 . . . CA/Dn converters, and through one MC1 . . . MCn microcontrollers and one of the CAN1 . . . CANn modules, the signals passes through a CAN-BUS to a processing unit UPd running a dedicated software application Sd. Through a CANi interface, the information is transmitted further through a wireless LAN, to a process unit UPa running a software application Sa that displays the radiography on a monitor Mon.

In the frame of the detector boom 2 some electronic modules are mounted, each one commanding groups of 16 detectors each, the number of modules used is determined by the length of the detector boom 2.

The detector boom 2 is connected to a data processing unit connected with the CANi interface. The dedicated software application Sd, running on the UPd unit, receives data from the CANi interface and sends them through a radio modem to the mobile control centre 12, where they are interpreted in order to create a radiography of the scanned object. This image is displayed on the monitor Mon, and another application allows the operator to apply different proprietary software filters on the image, in order to enhance some parameters of the image.

The wireless LAN is used to connect the data processing units Upa and Upd.

The exclusion area protection subsystem 13 is an active radiological protection subsystem, which operates directly the source 6, to automatically shut it down in the case that the exclusion area a has been breached. The active sensors of the exclusion area protection subsystem 13, are placed in groups of two in the extremities of a diagonal of the exclusion area a and angled 90 degrees one with the other, they create a virtual barrier two meters high and forty meters long, enough to limit a rectangular surface of maximum 40 m×40 m. These sensors are permanently radio connected with the control centre 12, where they send an alarm signal in case of a breach of the infrared barrier. This signal automatically closes the source 6 and activates a text, vocal and graphical message on the graphical interface of the operator's software application, indicating the breached side. The subsystem is designed to work in difficult weather conditions like rain, snow, wind, dust, extreme temperatures, etc.

The subsystem for protection of the exclusion area is deactivated to allow the entry/exit in/out of the exclusion area a, synchronized with the working times of the barriers 15 and 16. When the driver of the inspected vehicle has left the area, the subsystem is reactivated.

The automated traffic management subsystem 14 manages the barriers 15 and 16 and the traffic lights 17 and 18 placed at the entry and exit in the scanning lane in order to control the access of the vehicles that are inspected. This subsystem 14 is controlled automatically by the operator's software application. On the operator's graphical interface live status info are displayed in real time, like barrier up, barrier down, barrier rising, barrier descending, malfunction, red light on, green light on, defective red bulb, defective green bulb. The commands and status are sent throughout some corresponding interfaces and radio modems.

The mobile control centre 12, manage all the components of the mobile inspection system, insuring the process automation. For a controlled management and an exact evidence, all commands and feedbacks, status and human interactions are recorded in a "black-box". The communication with the mobile units 1 and 5 is realized through some high speed radio modems as hardware support for data and status communication.

In "scanning mode" the mobile control centre 12, is placed outside of the exclusion area a, close to the entry point. In an implementing variant, the centre 12 can be a caravan with two compartments, an office compartment and a bedroom compartment to provide the operator with optimal working and resting conditions in the case of itinerary travels to perform inspections in different sites. This configuration is preferred considering the possibility that the crew could receive long term and distance missions, and the independence to the accommodation conditions contributes to efficiency and optimization.

The caravan into which the mobile control centre 12 is lodged, is equipped with an electric generator and acclimatisation equipment, that allows it to be electrically independent and to function within the normal limits even if bad weather. In "transport mode" this caravan is towed by the chassis 1 together forming the mobile nonintrusive inspection system.

The removal of the mobile control centre 12 outside of the exclusion area a, as well as the elimination of the need for a driver during scan, eliminates all risks of radiation exposure and makes possible the shortage of operating crew from minimum three per shift necessary to any existing similar systems, to only one person per shift.

What is claimed is:

1. A nonintrusive inspection method for scanning vehicles using radiations, comprising the following stages:

a vehicle is placed in a marked spot, having access in an exclusion area through an automated traffic management subsystem that automatically commands functioning of barriers and of entry/exit semaphores;

protection of the exclusion area is activated after a driver of the vehicle that is to be scanned left the exclusion area;

a scanning process is initiated by remote commands to a mobile scanning unit comprising detectors on a detector boom and a truck chassis, said truck chassis moving during the scanning process, and a mobile;

an x-ray, gamma, or neutron radiation source is activated;

slow and constant motion movement of the two mobile units is started, these units moving rectilinear and uniform on parallel trajectories framing the scanned vehicle, the source robot moving synchronized with the mobile scanning unit;

the movement of the mobile units is automatically controlled by electronic and informatics modules, connected with a control centre in a local area network, through radio modems, centre from which the mobile units receive commands, and towards which the mobile units send in real time status information and dedicated data;

stopping of the scan is performed automatically in one of the following situations: when the detector boom has passed the extremity of the scanned vehicle and the detectors receive the maximum level of radiation, at the end of a programmed scan length, when a protection limiter of the movement is triggered, when the protection of the exclusion area has been breached, when a proximity sensor has been triggered indicating dangerous distance between the detector boom and the scanned vehicle, and when obstacles close to guiding paths of the mobile units have been automatically detected by sensors placed on the mobile units;

an image resulted from scanning the vehicle is displayed on an operator's monitor;

at the end of the displaying stage the protection of the exclusion area is automatically deactivated, and the vehicle is permitted to leave the scanning area;

the two mobile units move back to the start position and the scanning cycle is to be restarted.

2. Nonintrusive inspection system that implements the method described in claim 1, comprising: a mobile scanning unit comprising detectors on a detector boom and a truck chassis, said truck chassis, said truck chassis moving during the scanning process, the mobile scanning unit containing some detector areas specific to the radiation type of source used, a source robot carrier unit of an x-ray, gamma, or neutron radiation source, both units being autonomous with sensors detecting obstacles close to guiding paths of the units, with proximity sensors indicating the distance between the detector boom and the scanned vehicle and having subsystems with feedback, for automated control of speed and steering with a limiter for the protection of movement, a positioning synchronization subsystem and a hydraulic propulsion subsystem to realize a rectilinear and uniform slow motion of the scanning unit, and a mobile control centre, that is placed outside of the scanning area and that remotely manages all processes using a local area network and radio modems, including a subsystem for acquisition, processing, storage and displaying of a scanned image, wherein the system also includes an exclusion area protection subsystem, an automated traffic management subsystem which controls barriers and entry/exit semaphores and a computer management subsystem.

3. Nonintrusive inspection system according to claim 2, where the mobile scanning unit has a detector boom made out of an upper detector area and a lower detector area, the lower detector area being mounted independently, laterally to the right of the upper detector area, on a supplementary chassis, in an oscillatory fix in a perpendicular bolt on a longitudinal axle of the truck chassis and the upper detector area, mounted on a steel prop that can pivot in a bearing solidary with the supplementary chassis, the two detector areas having separate folding systems but unitary functionality during scanning procedures.

4. A nonintrusive inspection system according to claim 3, where the detector boom is made out of five segments orientated under different angles, and is made of light alloy assembled in a "T" shape.

5. A nonintrusive control system according to claim 2, where in another implementing variant, the subsystem for the automated control of speed and steering of the mobile unit, has an electric motor, to drive a steering column and an electronic automated command and control module and receives positioning information relative to the two guiding paths through some hardware/software modules and processes the positioning information through some module resulting in input for the positioning synchronization subsystem, connected to an execution servo systems of the chassis and of the source robot.

6. A nonintrusive inspection system according to claim 2, where in another implementing variant, the subsystem for the automated control of speed and steering receives information concerning the relative position of the units from some rotating beam laser sensors reflected in a fixed network of laser reflectors, through some modules and processes them through some hardware/software modules, supplying input for the positioning synchronization subsystem connected to execution servo systems of the chassis and the source robot.

7. A nonintrusive inspection system according to claim 2, where the hydraulic propulsion subsystem, that propels the chassis in slow motion has a mechanical gearbox for a combined drive subsystem, with a revelation sensor, a hydraulic pump with electronically controlled variable flow capacity, a hydraulic motor, an electronic command module, and dedicated software application for the automated speed control.

8. A nonintrusive inspection system according to claim 2, where the automated traffic management subsystem in the exclusion area and limitrophe area has some barriers with some traffic lights commanded wirelessly and remotely directly by a dedicated software application, and the exclusion area protection subsystem of the exclusion area is made out of some active presence sensors+40, a control module of the sensors status and an automatic shut down of the radiation source module in case the exclusion area has been breached.

9. A nonintrusive inspection system according to claim 2, where the subsystem for acquisition, processing, storage, and displaying of a scanned image is made out of some electronic modules that include some preamplifiers, some multiplexers, some analogue-digital converters, some microcontrollers, a data bus, some modules, a communication interface to a processing unit running a dedicated software application, connected in a wireless local area network (LAN) to another processing unit running another software application that displays the radiography of the scanned vehicle on a monitor.

10. A nonintrusive inspection system according to claims 3, where in another implementing variant, the subsystem for the automated control of speed and steering receives information concerning the relative position of the units from some rotating beam laser sensors reflected in a fixed network of laser reflectors, through some modules and processes them through some hardware/software modules, supplying input for the positioning synchronization subsystem connected to execution servo systems of the truck chassis and the source robot.

11. A nonintrusive inspection system according to claims 4, where in another implementing variant, the subsystem for the automated control of speed and steering receives information concerning the relative position of the units from some rotating beam laser sensors reflected in a fixed network of laser reflectors, through some modules and processes them through some hardware/software modules, supplying input for the positioning synchronization subsystem connected to execution servo systems of the truck chassis and the source robot.

12. A nonintrusive inspection system according to claims 5, where in another implementing variant, the subsystem for the automated control of speed and steering receives information concerning the relative position of the units from some rotating beam laser sensors reflected in a fixed network of laser reflectors, through some modules and processes them through some hardware/software modules, supplying the input for the positioning synchronization subsystem connected to the execution servo systems of the chassis and the source robot.

* * * * *